(12) United States Patent
Nakamura et al.

(10) Patent No.: US 6,672,449 B2
(45) Date of Patent: Jan. 6, 2004

(54) MOTORIZED ROLLER

(75) Inventors: Tatsuhiko Nakamura, Hyogo (JP);
Tomoyuki Fujimoto, Hyogo (JP);
Masaki Tanaka, Himeji (JP)

(73) Assignee: Itoh Electric Company Limited (JP)

( * ) Notice: Subject to any disclaimer, the term of this patent is extended or adjusted under 35 U.S.C. 154(b) by 0 days.

(21) Appl. No.: 09/931,195

(22) Filed: Aug. 16, 2001

(65) Prior Publication Data

US 2002/0060140 A1 May 23, 2002

(30) Foreign Application Priority Data

Nov. 22, 2000 (JP) .......................................... 2000/355856

(51) Int. Cl.⁷ .............................................. B65G 13/06
(52) U.S. Cl. ........................ 198/788; 198/789; 198/835
(58) Field of Search ............................... 198/788, 791, 198/835, 789; 384/900

(56) References Cited

U.S. PATENT DOCUMENTS

| 3,362,686 A | 1/1968 | MacKay | |
|---|---|---|---|
| 4,082,180 A | 4/1978 | Chung | |
| 5,413,209 A | * 5/1995 | Werner | 198/788 |
| 5,811,137 A | * 9/1998 | Clark et al. | 100/168 |
| 6,125,993 A | * 10/2000 | Hansson | 198/788 |
| 6,244,427 B1 | * 6/2001 | Syverson | 198/788 |
| 6,447,336 B1 | * 9/2002 | Fannin et al. | 439/587 |

FOREIGN PATENT DOCUMENTS

| DE | 3516258 A1 | 11/1986 |
|---|---|---|
| EP | 0439787 A1 | 8/1991 |
| JP | 6-227630 | 8/1994 |
| JP | 7-279998 | 10/1995 |
| JP | 8-2643 | 1/1996 |
| JP | 8-91532 | 4/1996 |
| JP | 8-188219 | 7/1996 |
| JP | 11-79358 | 3/1999 |

* cited by examiner

Primary Examiner—Gene O. Crawford
(74) Attorney, Agent, or Firm—Wood, Phillips, Katz, Clark & Mortimer (57) ABSTRACT

By housing a driver circuit board in a motorized roller having a built-in electric motor, the troublesome external wiring can be dispensed with, thereby facilitating the mounting of the roller on other apparatus. The heat generating inside the roller from a driver circuit board in the roller is dissipated by a heat releaser, thus protecting the devices from damage and avoiding failure of control.

22 Claims, 8 Drawing Sheets

MOTORIZED ROLLER

BACKGROUND OF THE INVENTION

1. Field of the Invention

The present invention relates to a roller driven by its own built-in electric motor. Herein, this type of roller will be called "motorized roller".

2. Description of Related Art

The motorized rollers are in wide use in conveyors for transporting commodity and products. The motorized roller usually incorporates a speed reducer, and the typical examples are disclosed in Japanese Laid-open Patent Applications Nos. Hei 11-79358, Hei 8-188219, Hei 8-2643, Hei 7-279998, and Hei 6-227630.

The known motorized rollers use an induction motor. In recent years, in order to meet the general demand for more precise control, it is common that the motorized rollers use brushless motors.

The main advantages of a brushless motor are the omission of a brush or communicator, the attainment of a constant output for the same conditions, and the operational efficiency.

On the other hand, the brushless motor has disadvantages that it requires a pole detector which needs lead wires in addition to the power cable, and a complicated motor driver circuit board must be equipped to control a current supplied to the brushless motor, the circuit board being mounted on the body of the motorized roller, and the lead wires from the roller being connected to the circuit board. The external wiring is a troublesome work. An example is disclosed in Japanese Laid-open Patent Application No. Hei 8-91532.

Therefore, the known motorized roller using a brushless motor is practically disadvantageous in that the consumption of time and toil is involved in electrical connection when the motorized roller is incorporated in machines such as conveyors, and the wiring tends to become twisted in an untidy state. In addition, the repair of the motorized roller consumes time and toil.

The present invention is directed to solve the problems pointed out above, and has for its object to provide a motorized roller which ensures easy wiring connection and ready installing into other machines such as conveyors.

Another object of the present invention is to provide a motorized roller capable of releasing heat which otherwise would be likely to build up in the roller body and damage the component parts therein.

SUMMARY OF THE INVENTION

According to one aspect of the present invention, the motorized roller includes a roller body, an electric motor, a speed reducer, and an electronic device accommodated or housed within the roller body to control a current supplied to the motor, wherein the roller body accommodates the electric motor and the speed reducer, and is rotated by the electric motor through the speed reducer.

According to another aspect of the present invention, the motorized roller includes a roller body, an inner shell, an electric motor, a speed reducer, and an electronic device housed within the inner shell to control a current supplied to the motor, wherein the inner shell accommodates the electric motor and the speed reducer, and the roller body is rotated by the electric motor through the speed reducer.

According to a further aspect of the present invention, the motorized roller has a roller unit which includes a casing, a fixed shaft protruding from the casing, a driving portion provided within the casing, an electronic device housed within the casing, and a rotating member having a larger diameter than the casing, wherein the driving portion includes an electric motor, the electronic device is adapted to control a current supplied to the motor, and the rotating member is rotatable upon reception of a force from the driving portion. When the casing is inserted in an external roller separately prepared, the fixed shaft protrudes from the external roller and the rotating member engages with an inner surface of the external roller to rotate the external roller.

Preferably, the motorized roller includes a heat releaser housed within the roller body, wherein the heat releaser directly or indirectly contacts the electronic device so as to allow heat generating in and around the electronic device to dissipate.

Preferably, the electronic device incorporated in the motorized roller of the present invention is a transistor to control a current supplied to the motor but as a result of the amplification of a current through the transistor, heat generates, and builds up in the roller body. The heat is likely to damage the components, and lead to loss of control. Therefore, the dissipation of heat is essential for smoothly operating the motorized roller.

It is preferred that thermally conductive grease is applied between the heat releaser and the electronic device to facilitate heat transfer between them.

The heat releaser and the electronic device may be separated by a suitable electrical insulator, which hereafter will be referred to as "insulator".

According to a further aspect of the present invention, an inner shell is provided in the roller body to accommodate the electronic device and a heat releaser, such as through radiation and conduction, which is directly or indirectly kept in contact with the inner shell and the electronic device. The heat releaser housed inside the inner shell together with the electronic device works as a heat radiator for dissipating heat generating in and around the electronic device. In this case, the inner shell also radiates and dissipates heat and works as a part of the heat radiator, whereas the heat releaser works also as a heat conductor. Preferably, the area of the outer surface of the inner shell is larger than that of the heat releaser so as to facilitate heat dissipation. Thus the electronic device and others are protected from being damaged by heat. The inner shell is fixed with respect to the ground or floor; if it inadvertently rotates, undesired friction occurs between the heat releaser and the inner shell.

Preferably, the heat releaser has a curved outer surface conforming to the inner surface of the inner shell so as to prevent any gap from occurring therebetween and reducing the efficiency of heat transfer.

The electronic device can be housed in a container, for example, made of plastics, and the container is housed within the roller body together with the heat releaser, which is exposed to both inside and outside the container to prevent heat buildup in the container. The container is preferably provided with an opening such as an aperture or cutout into which the heat releaser is inserted.

Preferably, the fixed shaft has an internal bore through which a cable for supplying electrical current to the motor in the driving portion runs. Such a structure can be employed when main components are housed in a unit.

DETAILED DESCRIPTION OF THE PREFERRED EMBODIMENTS

Figure 1:
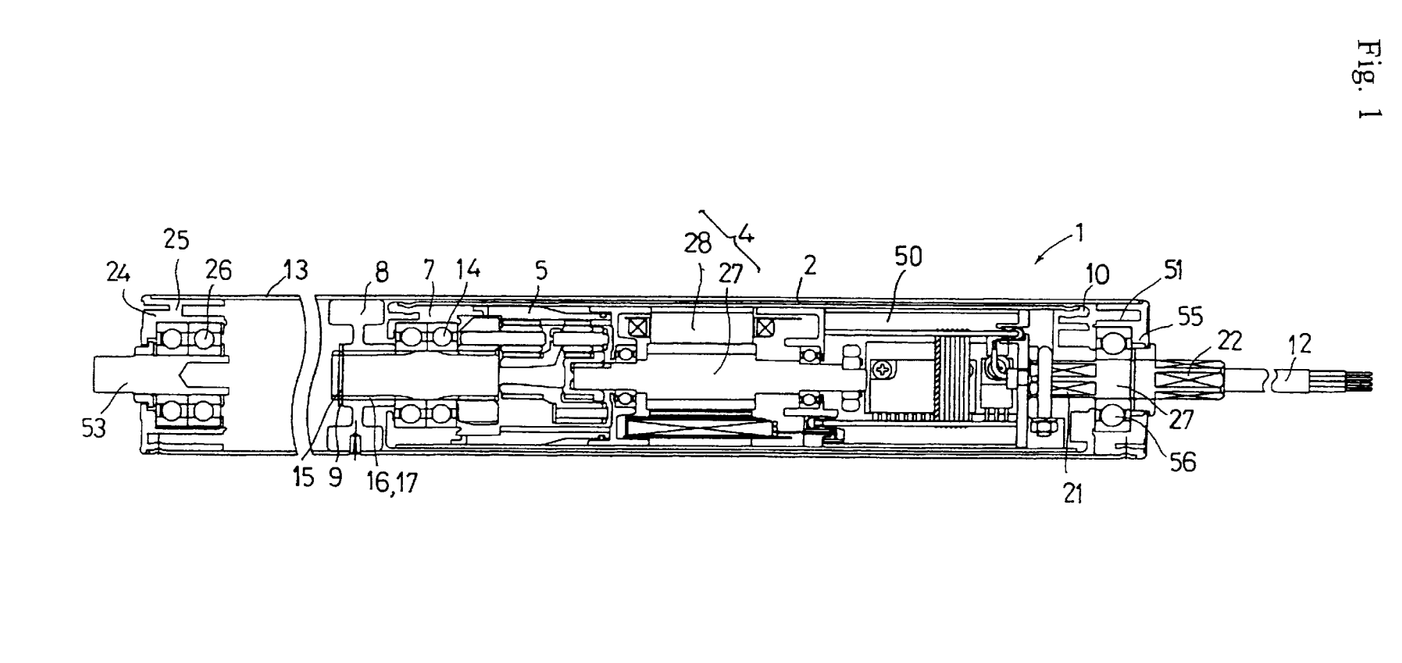
FIG. 1 is a cross-sectional view of the motorized roller of an embodiment of this invention.
Figure 2:
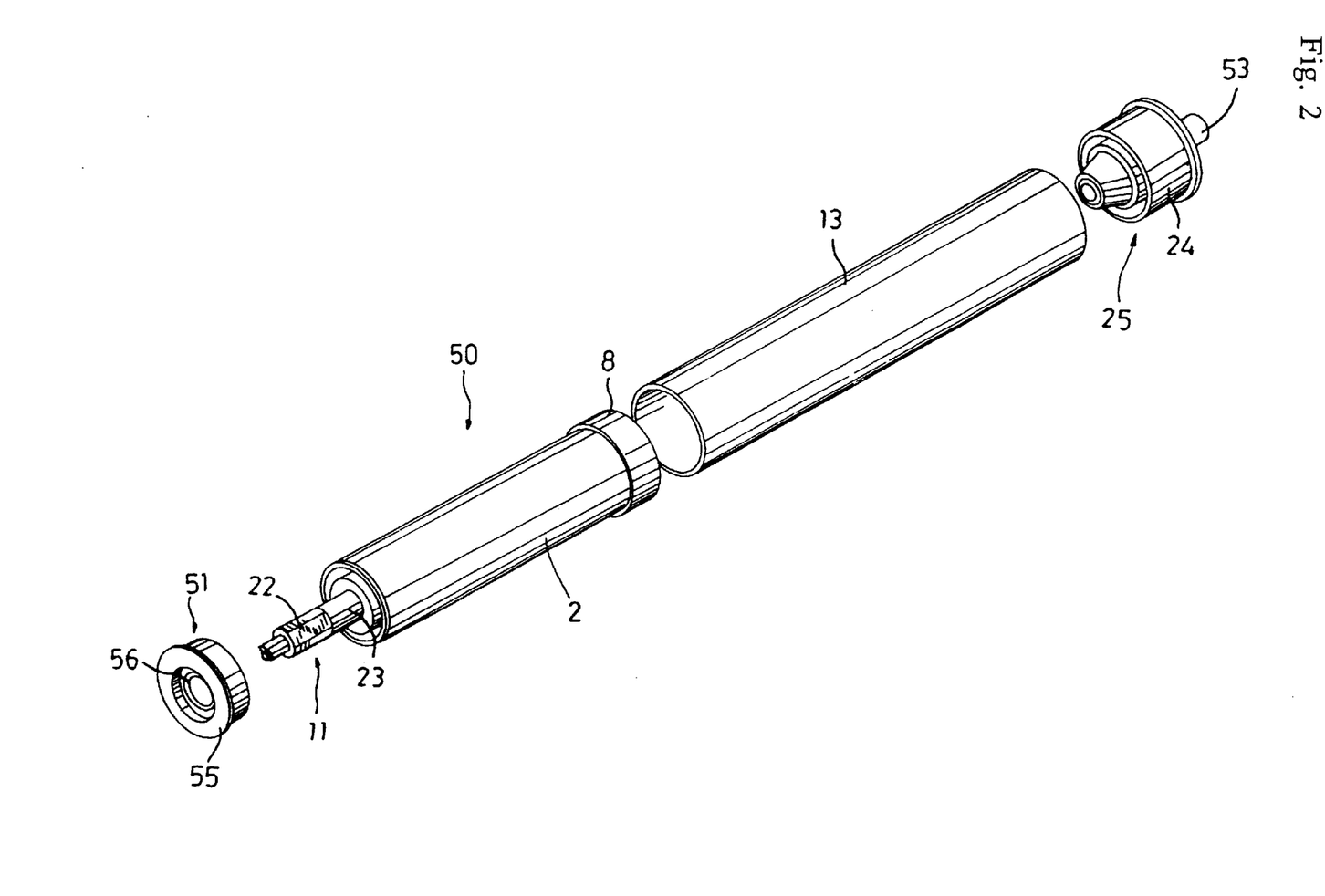
FIG. 2 is an exploded perspective view of the motorized roller illustrated in FIG. 1.

FIGS. 1 and 2 show a motorized roller 1 embodying the present invention. The motorized roller 1 is constructed in a unit 50 in which main components are housed, and the unit 50 is fixed to a cylindrical outer shell 13, which is also called "roller body" or "external roller".

Figure 3:
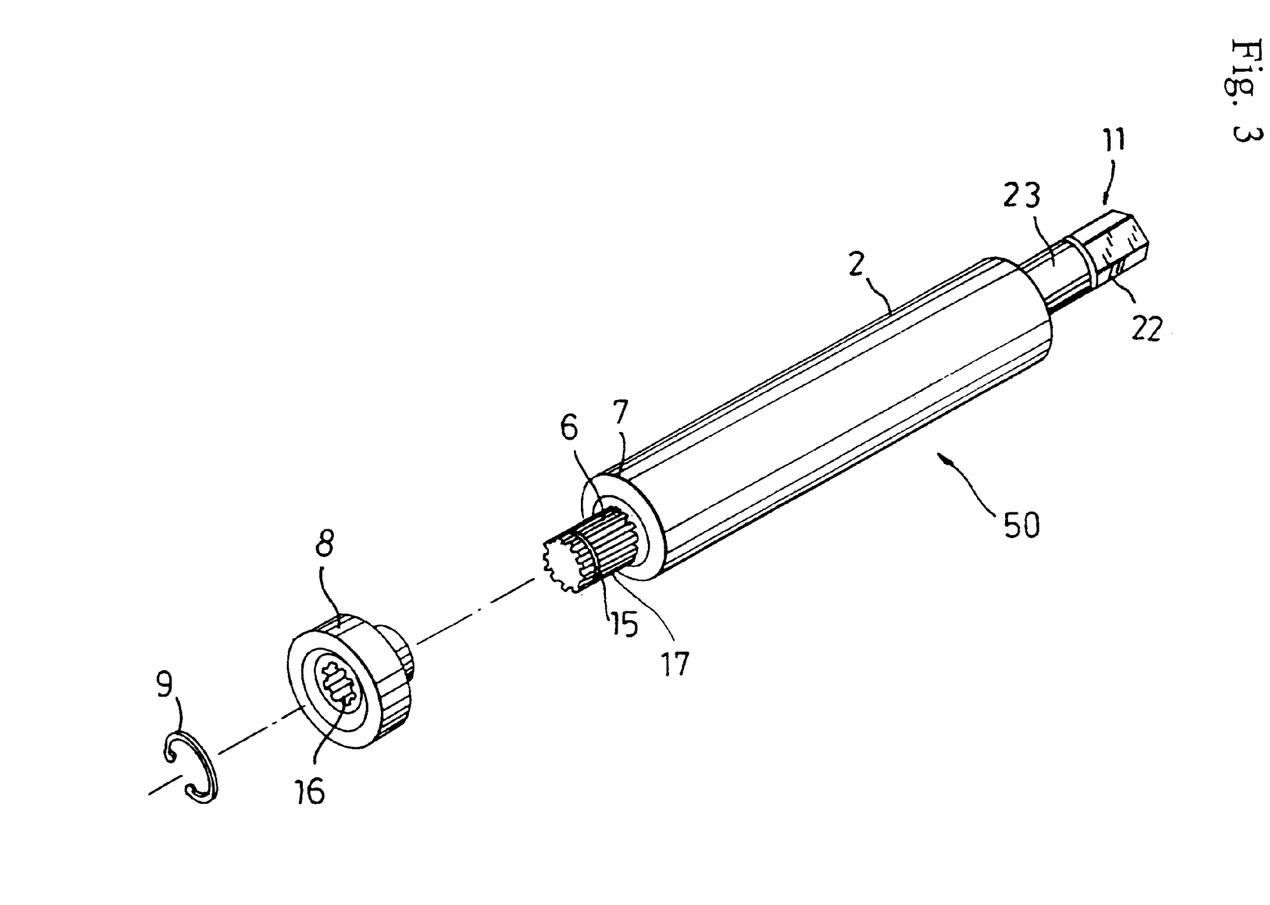
FIG. 3 is a perspective view of the unit for the motorized roller illustrated in FIG. 1.
Figure 4:
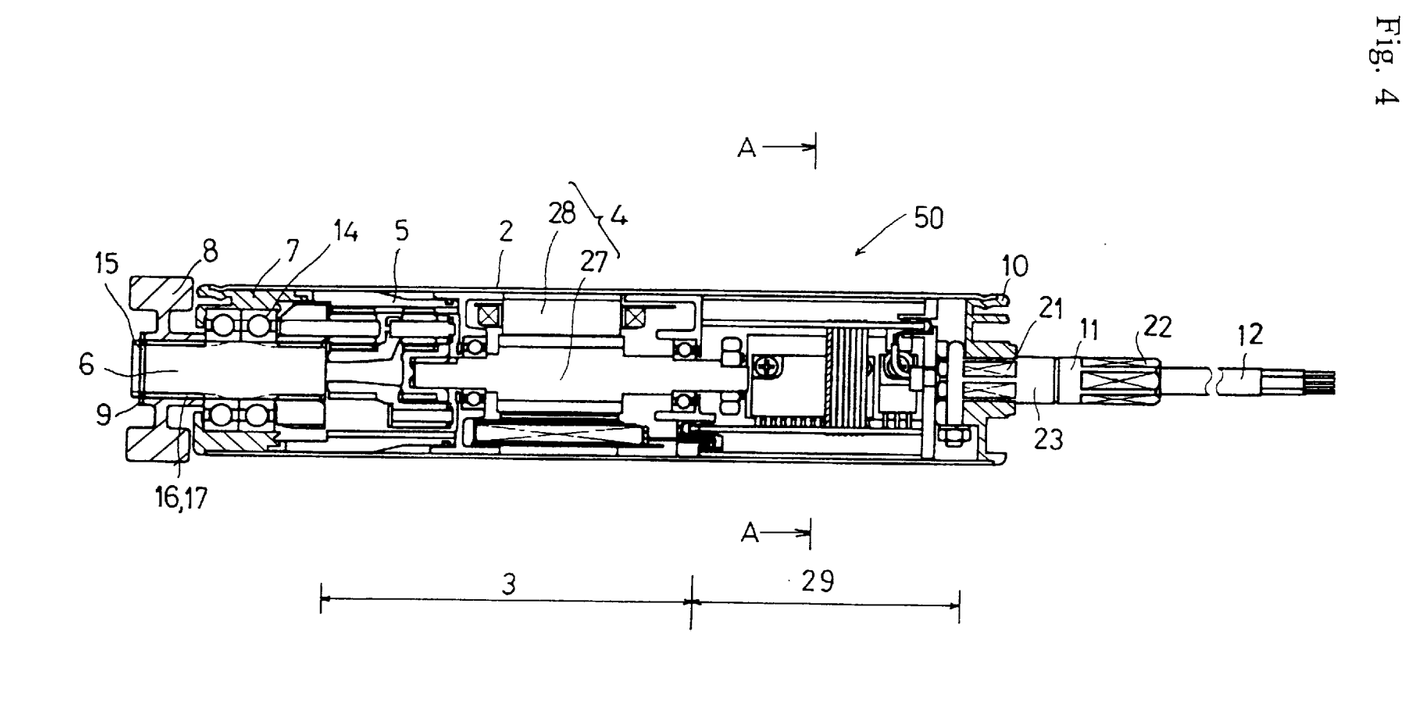
FIG. 4 is a sectional view of the unit for the motorized roller illustrated in FIG. 1.

As illustrated in FIGS. 3 and 4, the unit 50 includes a cylindrical casing 2, which, after assembly, acts as an inner shell of the motorized roller 1, a fixed shaft 11 protruding from the casing 2, a mechanical driving portion 3 built within the casing 2, a rotating member 8 having a larger radius than that of the casing 2, and a motor driver assembly 29 built within the casing 2 and controlling the mechanical driving portion 3, wherein the rotating member 8 is rotated by force generated in the mechanical driving portion 3.

Briefly, the unit 50 has a casing 2, which, after assembly, acts as an inner shell of the motorized roller 1, and a mechanical driving portion 3 and a motor driver assembly 29, which are mounted within the casing 2. The mechanical driving portion 3 specifically consists of an electrical motor 4 and a speed reducer 5.

The rotating member 8 is equipped at one end of the casing 2, slightly projecting radially from the casing 2, whereas the fixed shaft 11 externally protrudes from the other end of the casing 2. The rotating member 8 is engaged with a rotatable shaft 6, which will be hereinafter called "output shaft 6", extending from the mechanical driving portion 3 and protruding from the casing 2. The output shaft 6 and the fixed shaft 11 are mounted on the ends of the casing 2 by means of a output shaft holder 7 and a fixed shaft holder 10, respectively.

More particularly, the casing 2 is made of a metal cylinder having open ends. The shaft holder 7 is made of plastics. The shaft holder 7 is practically of cylindrical shape with an outer diameter substantially equal to the inner diameter of the casing 2. The holder 7 is fitted into an end portion (left end portion in FIGS. 3 and 4) of the casing 2.

The holder 7 has a pair of bearings 14 incorporated therein and disposed in series. Each of the bearings 14 has an inner diameter substantially equal to the diameter of the output shaft 6 and supports the shaft 6 rotatably so that the shaft 6 can rotate relative to the casing 2.

The fixed shaft holder 10 is also practically of cylindrical shape and is fitted into an end portion (right end portion in FIG. 4) of the casing 2.

The fixed shaft holder 10 has an inner diameter substantially equal to the diameter of the fixed shaft 11 so that the holder 10 fixes the shaft 11 to the casing 2 in an integral unit. More specifically, the holder 10 has no bearing interposed, and unifies the shaft 11 and the casing 2 as an integral and inseparable unit.

The rotating member 8 is practically of cylindrical shape and has an outer diameter larger than that of the casing 2. The rotating member 8 is made of zinc die cast.

When the rotating member 8 is to be fitted into the outer shell 13, the cylindrical surface of the member 8 is cut, scraped or ground and adjusted so that the outer diameter of the member 8 is substantially equal to the inner diameter of the outer shell 13.

The rotating member 8 has an internal gear 16 coaxial therewith. The internal gear 16 is provided so that rotational force of the output shaft 6, driven through the motor 4, is transmitted efficiently to the rotating member 8.

The output shaft 6 is supported rotatably relative to the casing 2 through the shaft holder 7 and disposed coaxial with the unit 50. The shaft 6 has an external gear 17 on the end portion thereof. The external gear 17 is formed to be in mesh with the internal gear 16.

In the illustrated roller 1 the output shaft 6 and the rotating member 8 are joined together by means of gears, but instead of gears, a key or a spline can be used.

A circular groove 15 is formed on the end portion of the output shaft 6. A C-ring 9 is fitted into the groove 15 to protect the rotating member 8 from dropping out of the shaft 6. More specifically, the rotating member 8 is detachably mounted on the output shaft 6 and a C-ring is fitted outside the member 8 to protect the member 8 from dropping out.

The fixed shaft 11 is disposed at the end portion of the unit 50 and secured integrally to and coaxially with the casing 2 through the fixed shaft holder 10. The fixed shaft 11 has an elongated axial bore, through which a cable 12 for feeding electric current runs. The cable 12 is connected to the motor driver assembly 29, through which the current is supplied to the driving portion 3.

The fixed shaft 11 has a hexagonal shape in cross section at either of end portions 21, 22. A circular cross section portion 23 with a smooth surface is formed between the hexagonal cross section portions 21, 22. One end portion 21 with hexagonal section is supported relatively unrotatably through the fixed shaft holder 10. The other end portion 22 with hexagonal section is used for securing the motorized roller 1 to a foreign member such as a conveyor frame after completing the motorized roller 1 by inserting the unit 50 into the outer shell 13.

The portion 23 with circular cross section contacts with a bearing 56 of an outer shell holder 51 as the unit 50 is inserted into the outer shell 13.

Figure 6:
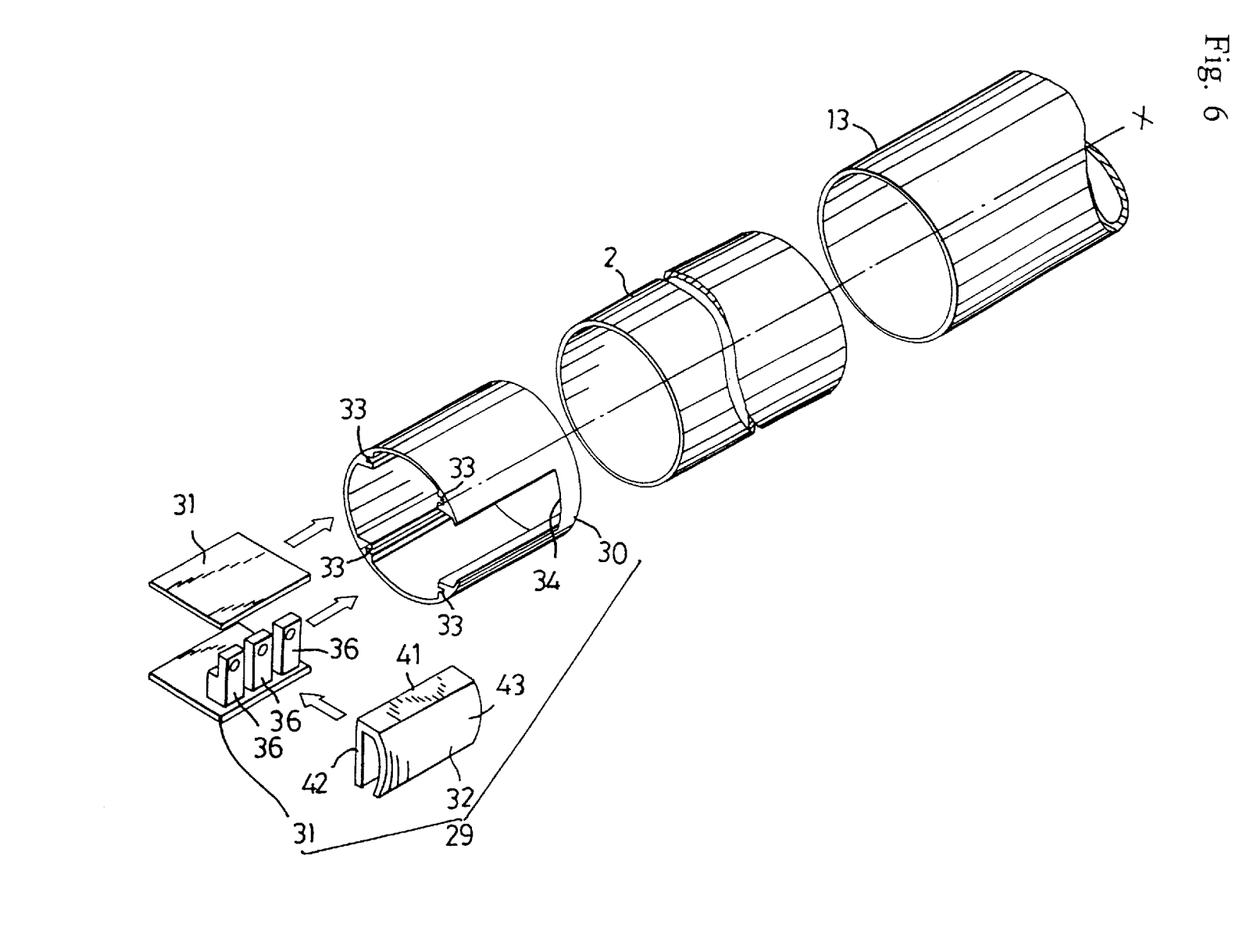
FIG. 6 is a perspective view of the motor driver assembly illustrated in FIG. 4.

The motor driver assembly 29 includes a driver casing 30, a pair of driver circuit boards 31 and a heat radiating plate 32.

The driver casing 30 functions as a container for electronic devices. The driver casing 30 is a virtually cylindrical member made of plastic with an outer diameter substantially equal to the inner diameter of the cylindrical casing 2. The cylindrical surface of the driver casing 30 has a cutout 34. A heat radiating plate 32 is mounted on the driver circuit board 31 and the board 31 is inserted into the driver casing 30 through the cutout 34. Therefore, the width and the length of the cutout 34 are substantially equal to, or slightly larger than, those of the plate 32. Receptacles 33 consisting of two pairs of grooves parallel with each other are formed on the inner surface of the driver casing 30. As illustrated in FIG.

Figure 5:
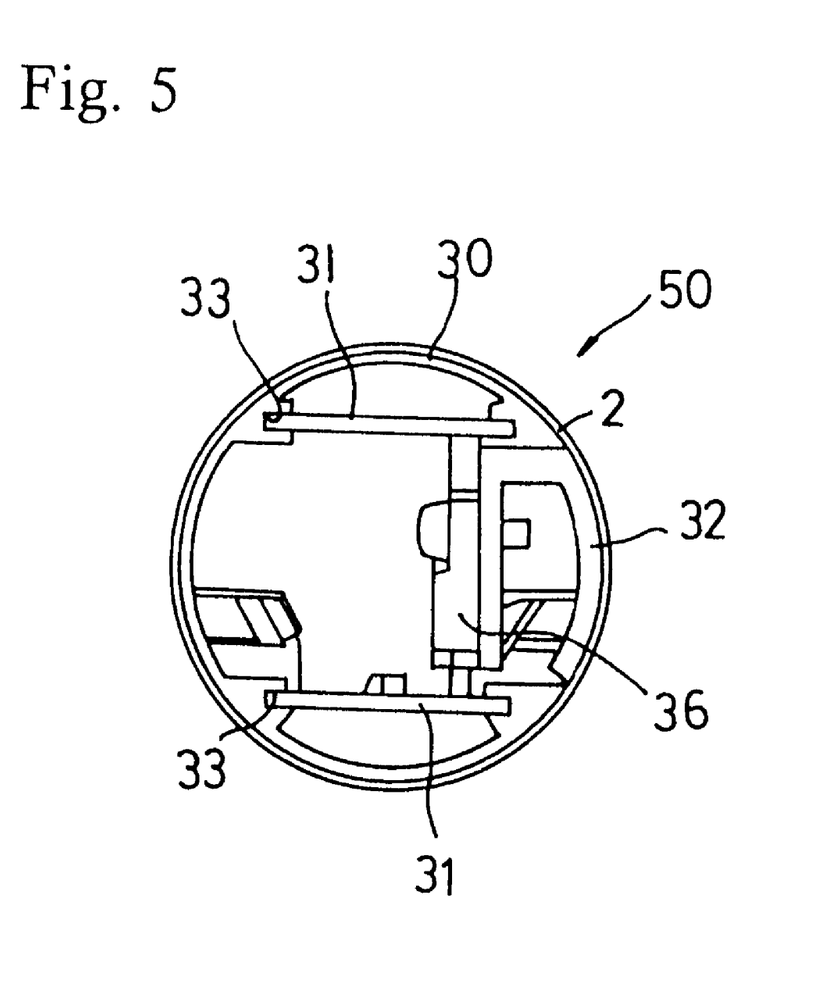
FIG. 5 is a cross-sectional view of the unit taken along line A—A of FIG. 4.

5, the receptacles 33 support a pair of the driver circuit boards 31 parallel to an X axis.

Figure 7:
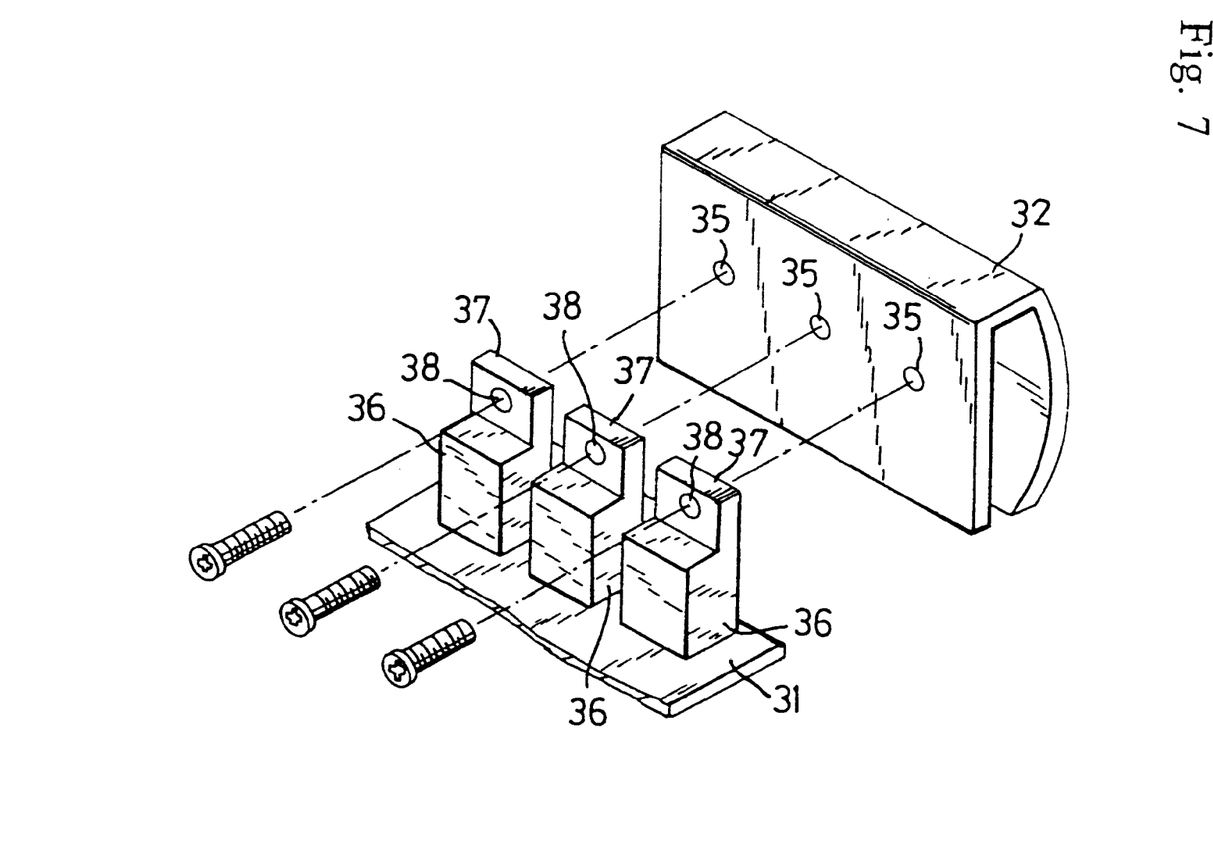
FIG. 7 is an enlarged perspective view of the motor driving circuit board 31 and the radiating plate 32 illustrated in FIG. 6.

In the illustrated examples, the cross section of the heat radiating plate 32 appears as if it were folded. The heat radiating plate 32 includes a planar wall 42 and a cylindrical wall 43 facing thereto with a clearance between them. A joint wall 41 connects between them. The planar wall 42 is contained within the driver casing 30 and an outer surface of the planar wall 42 is exposed to the inner space of the driver casing 30, which is a container for electronic devices. The planar wall 42 is in contact with the electronic devices on the driver circuit board 31 within the driver casing 30. The outer surface of the cylindrical wall 43 can be seen from outside the driver casing 30 through the cutout 34. As the curvature of the outer surface of the cylindrical wall 43 which can be seen from outside of the driver casing 30 is substantially identical to the curvature of the outer surface of the driver casing 30, the portion conforms smoothly to the outer surface of the driver casing 30.

The radiating plate 32 is made of metal, unlike the driver casing 30. The planar wall 42 has a plurality of threaded bores 35 so that electronic devices on the driver circuit board 31 are secured to the wall 42.

Electronic devices for controlling the motor 4 are mounted on the driver circuit board 31. The electronic devices include transistors 36, operational amplifiers, logical circuits, etc. Two driver circuit boards 31 are contained within a driver casing 30.

Each transistor 36 in his invention has on its back an electrode 37, which has a through-hole 38 for securing the transistor 36 to the radiating plate 32. In most cases, a collector electrode should be selected as the electrode 37.

For assembling the driver assembly 29, transistors 36 on the driver circuit board 31 are secured to the radiating plate by means of screws through the through-hole 38. Then edges of the driver circuit boards 31 are inserted into the receptacles 33 so that the radiating plate 32 is contained within the cutout 34.

Preferably thermally conductive grease may be applied between the transistors 36 and the radiating plate 32.

Figure 8:
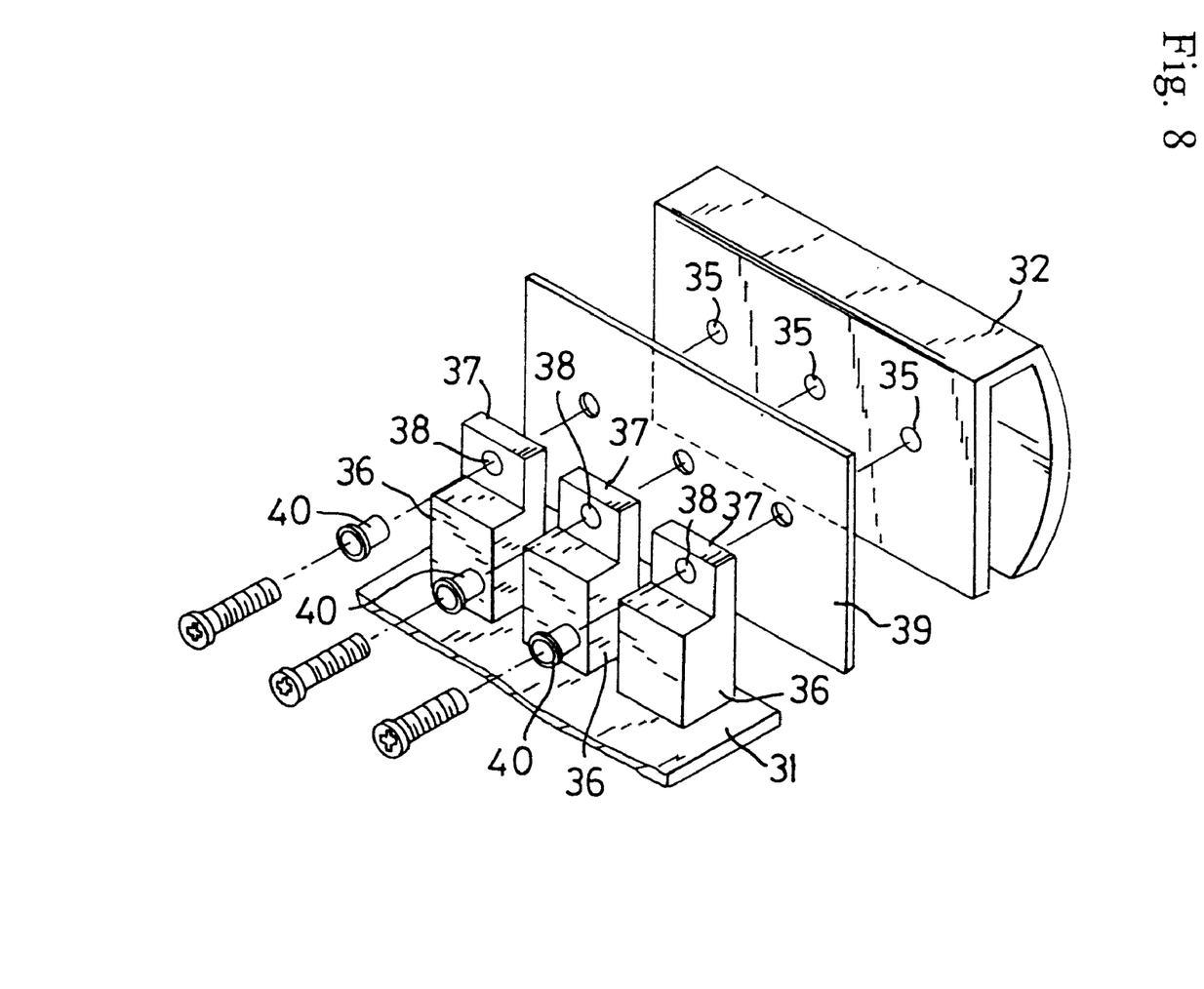
FIG. 8 is an enlarged perspective view of the motor driving circuit board 31 and the radiating plate 32 of a modified example of this invention.

In case the collector electrodes is short-circuited when the transistors 36 are secured to the radiating plate 32 by means of screws and holes 35, 38, an electrical insulating film 39 can be sandwiched between the transistors 36 and the radiating plate 32 as illustrated in FIG. 8, and to increase heat conductivity silicone grease which has relatively high thermal conductivity is applied to at least one surface of the film 39. Preferably electrical insulating caps 40 may be disposed between the holes 38 and the screws.

The driver assembly 29 is so constructed that the outer surface of the cylindrical wall 43 of the radiating plate 32 contacts the inner surface of the cylindrical casing 2. Therefore, the radiating plate 32 contacts the electronic devices such as the transistors 36 inside the driver casing 30 and contacts the casing 2 outside the driver casing 30.

The driving portion 3 is composed of an electric motor 4 and a speed reducer 5. The motor 4 includes a rotor 27 utilizing permanent magnets and disposed on the central axis and a stator 28 formed of coils surrounding the rotor 27. Hall elements (not shown) are utilized for pole detectors of the motor.

The speed reducer 5, intervening between the motor 4 and the output shaft 6, transmits torque from the motor 4, reducing the rotational speed.

The rotation of the motor 4 is entirely controlled through the driver circuit board 31 of the driver assembly 29.

The illustrated roller 1 includes the unit 50 and the outer shell 13 to build the unit therein.

More specifically, the motorized roller 1 utilized in this invention is constructed by inserting the unit 50 into the outer shell 13 having desired shape, length and thickness.

Now, the manner of assembling the motorized roller 1 is described.

A user of the motorized roller 1 separately provides the outer shell 13 and outer shell holders 25, 51 to be equipped on both ends of the outer shell 13. The cross sectional shape, length and thickness of the outer shell 13 may be determined at discretion. As illustrated in the left side of FIG. 1, one outer shell holder 25 is constructed by integrating a cylindrical plug 24 to be fitted into the outer shell 13, a pair of bearings 26 disposed in series and a fixed shaft 53. As illustrated in the right side of FIG. 1, the other outer shell holder 51 is constructed by integrating a cylindrical plug 55 to be fitted into the outer shell 13 and a bearing 56.

Before inserting the unit 50 into the outer shell 13, the outer diameter of the rotating member 8 of the unit 50 is adjusted to the inner diameter of the outer shell 13 by machining.

In detail, at first the C ring 9 is detached from the output shaft 6, and then the rotating member 8 is separated from the output shaft 6. Then an outer surface of the rotating member 8 is cut, scraped or ground by means of a lathe or other machine tool so that the outer diameter of the member 8 is substantially identical to the inner diameter of the outer shell 13.

After finishing the machining, the rotating member 8 is put back so that it engages again with the output shaft 6 and the C ring 9 is attached to the output shaft 6.

Then, as illustrated in FIG. 2, the casing 2 of the unit 50 is inserted into the outer shell 13 so that the rotating member 8 contacts and engages with an inner surface of the outer shell 13. Preferably the engagement of the rotating member 8 with the outer shell 13 is strengthened by caulking the outer shell 13 from outside or by punching the outer shell 13, if necessary. Pins may be inserted between the rotating member 8 and the outer shell 13, if necessary.

Then outer shell holders 25, 51 are equipped on both ends of the outer shell 13. In detail, as illustrated in FIGS. 1 and 2, the outer shell holder 25, which is constructed by integrating the cylindrical member 24, the bearings 26 and the fixed shaft 53, is equipped on the end near the rotating member 8. On the other hand, the outer shell holder 51, which is constructed by integrating the cylindrical member 55 and the bearing 56, is equipped on the fixed shaft 11, with the fixed shaft 11 inserted into the inner ring of the bearing 56 and with the round cross section portion 23 contacting the inner side of the inner ring.

The motorized roller 1 is assembled by the procedures described above.

After securing the unit 50 within the outer shell 13 and the outer shell holder 25, 51 to the outer shell 13, as electric power is supplied to the motor driver circuit board 31 and the driving portion 3, the rotor 27 of the motor 4 rotates about an axis due to change of magnetic flux. The speed reducer 5 gains torque from the rotor 27 and reduces rotation. The torque is further transmitted through the output shaft 6 to the rotating member 8 engaging with the shaft 6.

As the outer shell 13 is supported on the bearings 26, 56 rotatably relative to the fixed axes 11, 53, if the axes 11, 53 are secured to other unrotatable members, the outer shell 13 solely rotates relative to the axes by receiving power from the driving portion 3.

The inner shell casing 2 does not rotate with the outer shell 13, for the casing 2 is integral with the fixed axis 11.

In this embodiment, the driver circuit board 31 equipped within the outer shell 13 is fed with electricity through the cable 12 and controls current outputted to the motor 4 in response to conditions of the motor 4.

Therefore, electronic devices such as the transistors 36 mounted on the driver circuit boards 31 generate heat in operation.

As an internal resistance of semiconductor, contrary to metal, generally decreases with higher temperatures, if the temperature of the electronic devices are raised, too much electric current may be passed through the electronic devices, resulting in failure of control. To avoid such failure, in the illustrated roller 1, a radiating plate 32 is attached to the transistors 36 which generate heat, to conduct heat out of the driver assembly 29.

More specifically, in the motorized roller 1, as the heat-generating transistors 36 contact the radiating plate 32, which in turn contacts the inner shell casing 2, which has a larger radiating surface, heat generated in the transistors 36 is conducted through the radiating plate 32 and the inner shell casing 2 and dissipated externally.

More specifically, in the illustrated motorized roller 1, part of heat generated in the transistors 36 is dissipated externally directly through the radiating plate 32 and the other part of the heat is dissipated externally through the radiating plate 32 and the inner shell casing 2. Therefore, in the illustrated motor 1, the radiating plate 32 functions also as a heat conducting member.

In the motorized roller 1, heat generated in the transistors 36 can be conducted to the inner shell casing 2, as the radiating plate 32 made of metal contacts both the transistors 36 and the casing 2 when the driver assembly 29 is held within the casing 2.

By incorporating the driver circuit board 31 into the motorized roller, an improvement of labor efficiency and apparent simplicity and neatness are attained. Stabilized control is also attained since heat generated in the driver assembly 29 is dissipated externally through radiating plate 32.

Though the outer shell 13 and the rotating member 8 are engaged directly in the embodiment described above, another member or other members may intervene between the outer shell 13 and the member 8 for the sake of self-aligning of the axes.

The motorized roller 1 utilizes the unit 50 comprising a set of integrated members and functioning as both a power-generating unit and a power-transmitting unit. By utilizing the unit 50, a desired motorized roller can be fabricated at user's discretion.

As described above, the motorized roller 1 facilitates external wiring, by reducing the number of lead wires connected out of the roller, and assembling the roller to other components or parts.

Also in this invention, heat generated in the electronic devices contained in the motorized roller is dissipated externally through the radiating plate to protect the devices from damage and avoid failure of control.

In this way, the motorized roller of this invention enhances operational efficiency and outward simplicity and ensures safe control in operation.

It is to be understood that the invention is not limited to the specific embodiments thereof. Many apparently widely different embodiments of this invention may be made without departing from the spirit and scope thereof.

What is claimed is:

1. A motorized roller comprising:
   a roller body;
   an electric motor;
   a speed reducer; and
   an electronic device,
   wherein the roller body accommodates the motor and the speed reducer,
   wherein the roller body is supported so that the body can be rotated by the motor through the speed reducer,
   wherein the electronic device is housed within the roller body and is capable of varying a current supplied to the electric motor from a power supply.

2. The motorized roller according to claim 1, wherein the electronic device includes a transistor.

3. The motorized roller according to claim 1, wherein the electronic device comprises a circuit board within the roller body, the circuit board fed from a supply and causing a variation of current from the supply to the electric motor in response to conditions of the motor.

4. A motorized roller comprising:
   a roller body;
   an electric motor;
   a speed reducer;
   an electronic device,
   wherein the roller body accommodates the motor and the speed reducer,
   wherein the roller body is supported so that the body can be rotated by the motor through the speed reducer,
   wherein the electronic device is housed within the roller body to control a current supplied to the motor; and
   a heat releaser housed within the roller body,
   wherein the heat releaser directly or indirectly contacts the electronic device.

5. The motorized roller according to claim 4, wherein thermally conductive grease is applied between the heat releaser and the electronic device.

6. The motorized roller according to claim 4, wherein an electrical insulator intervenes between the heat releaser and the electronic device.

7. The motorized roller according to claim 4, wherein the heat releaser and a device container made of plastic are housed within the roller body, the device container containing the electronic device and the heat releaser exposed to both inside and outside the device container.

8. The motorized roller according to claim 7, wherein an inner shell is housed within the roller body, the device container is housed within the inner shell and the heat releaser directly or indirectly contacts both the inner shell and the electronic device.

9. The motorized roller according to claim 7, wherein the device container has an opening into which the heat releaser is inserted.

10. A motorized roller comprising:
    a roller body;
    an electric motor;
    a speed reducer;
    an electronic device,
    wherein the roller body accommodates the motor and the speed reducer,
    wherein the roller body is supported so that the body can be rotated by the motor through the speed reducer,
    wherein the electronic device is housed within the roller body to control a current supplied to the motor; and an inner shell housed within the roller body,
wherein the inner shell accommodates the electronic device and a heat releaser, the heat releaser directly or indirectly contacting both the inner shell and the electronic device.

11. The motorized roller according to claim 10, wherein the inner shell is supported free from rotation.

12. The motorized roller according to claim 10, wherein the area of the outer surface of the inner shell is larger than that of the heat releaser.

13. The motorized roller according to claim 10, wherein the heat releaser has a curved outer surface conforming to the inner surface of the inner shell.

14. A motorized roller comprising:
a roller body;
an inner shell;
an electric motor;
a speed reducer; and
an electronic device adapted to control a current supplied to the motor:
wherein the roller body accommodates the inner shell;
wherein the inner shell accommodates the motor and the reducer;
wherein the roller body is supported so that the body is rotatable by the motor through the reducer;
wherein the electronic device is housed within the inner shell; and
wherein the electronic device is kept in contact with the inner shell.

15. The motorized roller according to claim 14 further comprising:
a device container made of plastic; and
a heat-conducting member:
wherein the device container is housed within the inner shell; and
wherein the heat-conducting member is inserted into an opening in the device container and is kept in contact with both the inner shell and the electronic device.

16. The motorized roller according to claim 14, wherein the electronic device includes a transistor.

17. The motorized roller according to claim 14, wherein the inner shell is supported unrotatably.

18. A unit for a motorized roller comprising:
a casing;
a fixed shaft protruding from the casing;
a driving portion housed within the casing;
a rotating member with larger outer diameter than the casing; and
an electronic device housed within the casing;
wherein the driving portion includes an electric motor;
wherein the electronic device is adapted to control a current supplied to the motor;
wherein the rotating member is rotatable upon reception of a force from the driving portion; and
wherein the casing is inserted into an external roller separately prepared, the fixed shaft protruding from the external roller and the rotating member engaging with an inner surface of the external roller to rotate the external roller.

19. The unit according to claim 18, wherein thermally conductive grease is applied between the heat-conducting member and the electronic device.

20. The unit according to claim 18, wherein the fixed shaft has an internal bore through which a cable for supplying electrical current to the motor in the driving portion runs.

21. The unit according to claim 18 further comprising a heat-conducting member kept in contact with both the electronic device and the casing.

22. A motorized roller comprising:
a roller body;
an electric motor;
a speed reducer; and
an electronic device,
wherein the roller body accommodates the motor and the speed reducer,
wherein the roller body is supported so that the body can be rotated by the motor through the speed reducer,
wherein the electronic device is housed within the roller body to control a current supplied to the motor,
wherein the electronic device includes a transistor.

* * * * *